United States Patent [19]

Reitenour

[11] Patent Number: 4,901,901
[45] Date of Patent: Feb. 20, 1990

[54] SHOPPING CART DESK

[76] Inventor: Peggy B. Reitenour, P.O. Box 241, Augusta, Mich. 49012

[21] Appl. No.: 309,489

[22] Filed: Feb. 13, 1989

[51] Int. Cl.⁴ .............................................. B62B 5/00
[52] U.S. Cl. ................................ 224/277; 224/42.01; 190/11; 280/33.992; 108/44
[58] Field of Search ...................... 224/273, 277, 42.01; 190/10, 11; 280/33.992, DIG. 4; 108/44, 115, 36, 38; 281/45; 206/425; 312/258

[56] References Cited

U.S. PATENT DOCUMENTS

| | | | |
|---|---|---|---|
| 2,673,774 | 3/1954 | Di Prima | 108/38 UX |
| 2,744,621 | 5/1956 | Kegevic | 312/DIG. 33 X |
| 3,099,268 | 7/1963 | Smith | 281/45 |
| 3,251,543 | 5/1966 | Bush et al. | 280/33.992 X |
| 4,260,055 | 4/1981 | Slaybaugh | 206/232 |
| 4,274,567 | 6/1981 | Sawyer | 224/42.43 |
| 4,450,994 | 5/1984 | Holland | 224/277 |
| 4,463,848 | 8/1984 | Parker | 206/214 |
| 4,470,620 | 9/1984 | Gerch | 190/11 X |
| 4,483,427 | 11/1984 | Gerch | 190/11 |
| 4,512,504 | 4/1985 | Owlett | 224/42.46 R |
| 4,583,753 | 4/1986 | Economy | 280/33.992 |
| 4,643,280 | 2/1987 | Hensley | 190/11 |
| 4,685,701 | 8/1987 | Amundson et al. | 224/277 X |
| 4,702,402 | 10/1987 | Ferri | 224/277 |
| 4,802,575 | 2/1989 | Martin | 206/232 |

FOREIGN PATENT DOCUMENTS

| | | | |
|---|---|---|---|
| 18804 | 9/1905 | United Kingdom | 108/36 |
| 2176332 | 12/1986 | United Kingdom | 280/33.992 |

Primary Examiner—Henry J. Recla
Assistant Examiner—R. M. Fetsuga
Attorney, Agent, or Firm—Leon Gilden

[57] ABSTRACT

A shopping cart desk is set forth including a first and second rigid plate with a flexible spine enabling overlying alignment of a first and second plate together with securement members to secure the first and second plates utilizing hook and loop fasteners. A plurality of aligned handles are positioned at uppermost edges of the plates for portability of the desk. Upon opening of the first and second plates into a horizontally aligned orientation relative to one another, first and second slide bolts secure the first and second plates in alignment to present storage, writing, and calculation facilities therewithin for use by an individual.

11 Claims, 1 Drawing Sheet

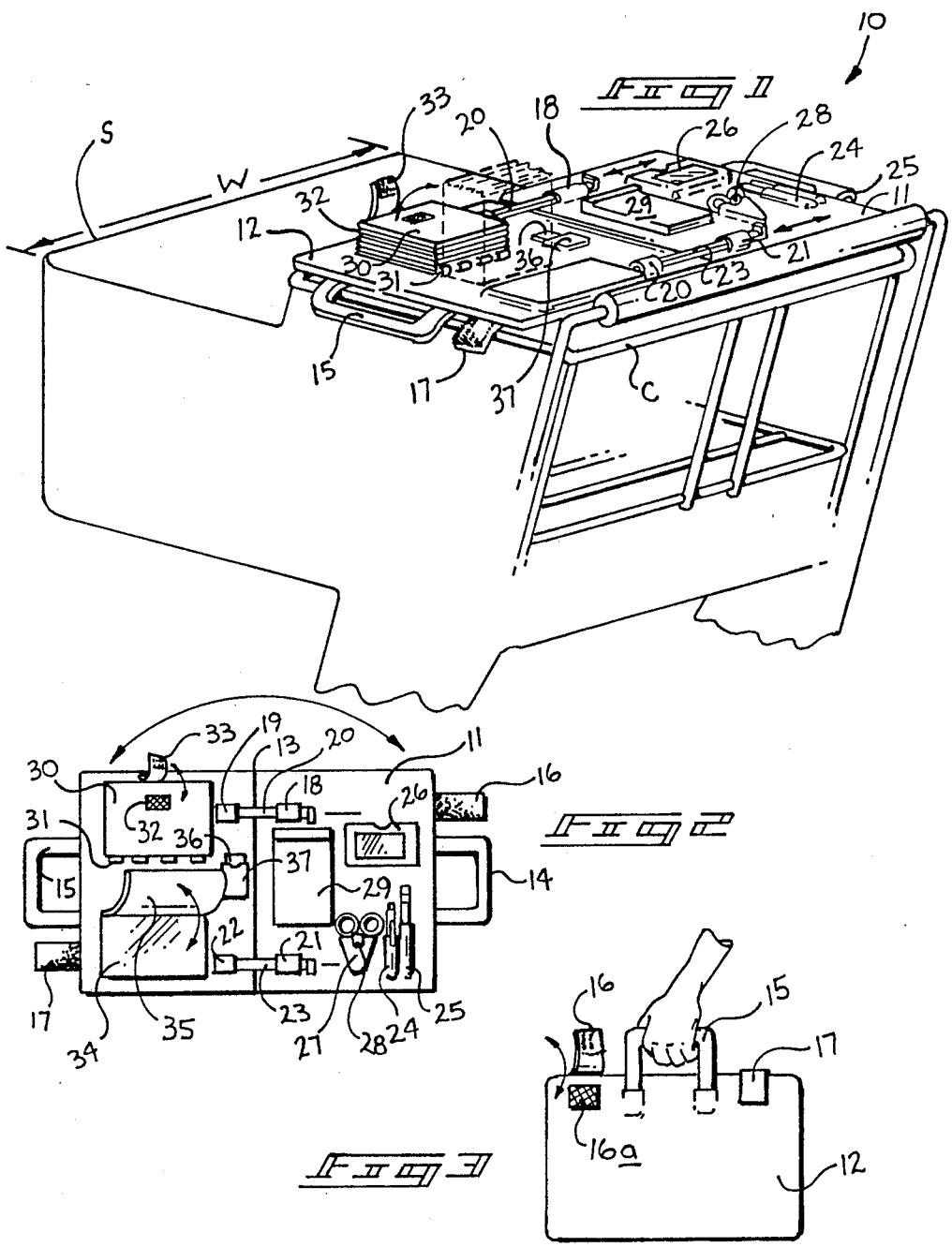

SHOPPING CART DESK

BACKGROUND OF THE INVENTION

1. Field of the Invention

The field of invention relates to shopping cart attachments, and more particularly pertains to a new and improved shopping cart desk wherein the same may be readily folded into a compact size for transport or storage and may be further opened to provide an aligned desk.

2. Description of the Prior Art

The use of various apparatus in combination with shopping carts is known in the prior art. Desks of the prior art, as may be appreciated, have been of a bulky and awkward construction requiring a substantial amount of space and, as may be understood, lacking the storage characteristic of the instant invention. Further, prior art devices, if provided a compact configuration, have heretofore failed to provide the various facilities required by an individual performing a shopping, such as at a grocery store. For example, U.S. Pat. No. 3,251,543 to Bush, et al, sets forth a shopping cart attachment wherein a shopping directory, writing surface, and memo is formed within a cabinet-like structure securable to a shopping cart handle. The Bush patent is of a relatively bulky and awkward configuration, as opposed to that of the instant invention.

U.S. Pat. No. 4,643,280 to Hensley sets forth a portable desk of a cabinet-like configuration provided with slots formed within lowermost terminal edges of side walls thereof for positioning within a shopping cart to provide a writing surface with storage therewithin. The Hensley patent is of an expansive organization and structure as opposed to that of the instant invention.

U.S. Pat. No. 4,583,753 to Economy sets forth a desk apparatus attachable overlying a portion of a child seat assembly within a shopping cart provided with a hinged lid to enable access to an interior storage unit of the apparatus. The Economy patent fails to provide the various facilities and accessories required by an individual performing a shopping, as set forth by the instant invention.

U.S. Pat. No. 4,274,567 to Sawyer sets forth a shopping cart type desk utilizing a writing surface with a pivotally mounted folder hingedly secured to an upper terminal edge of the writing surface for securement and storage of various articles therein, but as other prior art patents, fails to provide the various facilities and organizations of the instant invention.

U.S. Pat. No. 4,702,402 to Ferri sets forth a coupon container securable to a shopping cart formed with a hinged lid and a storage compartment interiorly thereof to enable access interiorly thereof for retrieval and storage of stored coupons therewithin.

As such, it may be appreciated that there is a continuing need for a new and improved shopping cart desk wherein the same addresses the problems of storage, portability, and availability of numerous facilities utilized by individuals in the acts of shopping, and in this respect, the present invention substantially fulfills this need.

SUMMARY OF THE INVENTION

In view of the foregoing disadvantages inherent in the known types of shopping cart desks now present in the prior art, the present invention provides a shopping cart desk wherein the same may be compactly stored when not in use and may be further easily and efficiently transported and secured overlying an existing shopping cart for use therewith. As such, the general purpose of the present invention, which will be described subsequently in greater detail, is to provide a new and improved shopping cart desk which has all the advantages of the prior art shopping cart desks and none of the disadvantages.

To attain this, the present invention comprises a shopping cart desk formed with a first and second plate hingedly mounted relative to one another formed with handles and securement members to enable portability of the device when not in use. Further, upon opening of the device, slide poles are positioned at upper and lower interior surfaces of the plates to maintain alignment of the plates upon positioning of the plates overlying a shopping cart and is of a width substantially equal to that of the shopping cart. The desk assembly includes various facilities for use in shopping, such as an accordion folder for storage of coupons, a coupon presentation plate, storage of various writing implements, scissors, a calendar, a calculator and a writing surface for utilization by an individual performing a shopping.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject-matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved shopping cart desk which has all the advantages of the prior art shopping cart desks and none of the disadvantages.

It is another object of the present invention to provide a new and improved shopping cart desk which may be easily and efficiently manufactured and marketed.

It is a further object of the present invention to provide a new and improved shopping cart desk which is of a durable and reliable construction.

An even further object of the present invention is to provide a new and improved shopping cart desk which is susceptible of a low cost of manufacture with regard to both materials and labor, and which accordingly is then susceptible of low prices of sale to the consuming public, thereby making such shopping cart desks economically available to the buying public.

Still yet another object of the present invention is to provide a new and improved shopping cart desk which provides in the apparatuses and methods of the prior art some of the advantages thereof, while simultaneously overcoming some of the disadvantages normally associated therewith.

Still another object of the present invention is to provide a new and improved shopping cart desk wherein the same may be readily and compactly stored during periods of storage and transport thereof and may be further readily opened and rigidly aligned to provide a desk presenting a plurality of facilities therewithin for use by an individual.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is a top orthographic view of the instant invention.

FIG. 3 is an orthographic view taken in elevation of the instant invention in a folded configuration for transport thereof.

DESCRIPTION OF THE PREFERRED EMBODIMENT

With reference now to the drawings, and in particular to FIGS. 1 to 3 thereof, a new and improved shopping cart desk embodying the principles and concepts of the present invention and generally designated by the reference numeral 10 will be described.

More specifically, it will be noted that the shopping cart desk apparatus 10 essentially comprises a first rigid plate 11 formed with exterior and interior parallel faces pivotally mounted in an edge-to-edge orientation to an equally dimensioned second rigid plate 12 by a flexible spine 13 coextensively formed between confronting edges of the first and second rigid plates 11 and 12 respectively. A first handle 14 is mounted proximate an upper terminal edge of the first rigid plate 11 with a second handle 15 of complementary configuration to the first handle 14 mounted proximate an upper terminal edge of the second plate 12 to form a unitary grip upon folding of the first and second plate together, as illustrated in FIG. 3 for example. A first securement flap 16 is positioned adjacent the first handle 14 with a second securement flap 17 positioned adjacent the second handle 15 with the securement flaps 16 and 17 formed with hook and loop fasteners securable to hook and loop fastener patches positioned on the exterior surface of the cooperating other plate. For example, a first vehicle attachment patch 16a is positioned in alignment with the handle 15 and the second securement flap 17 on the opposite side of the handle 15 to receive the hook and loop fasteners of the first securement flap 16 Similarly, a further hook and loop securement patch is positioned in alignment with the first securement flap 16 and the first handle 14 to receive the second securement flap 17 in a similar manner.

To maintain alignment of the shopping cart desk 10 when positioned overlying the shopping cart "S", and particularly over the child seat assembly "C", a plurality of slide bolts are utilized. When the second plate 12 is pivoted at 180 degree orientation relative to the first plate 11 to provide an aligned interior surface, a first loop 18 is positioned proximate an inner edge of the first plate 11 with a second loop 21 positioned on the first plate 11 at an inner edge spaced from the first loop 18. A first securement pocket 19 is secured on the second plate 12 in alignment with the first loop 18 with a second securement pocket 22 formed on the second plate 12 in alignment with the second loop 21. Respective first and second rigid slide bolts 20 and 23 each provided with enlarged heads are slidable from a first position wherein the lowermost terminal edges of the slide bolts are wholly positioned within the first plate to a second position wherein the slide bolts and their terminal end is receive within respective securement pockets 19 and 22 to provide a rigid configuration to enable the shopping cart desk 10 to rigidly be positioned over the shopping cart "S" and to effect a lengthwise dimension substantially equal to that of the shopping cart width "W".

Formed on the interior surface of the first plate 11 is a pen pocket 24 with a pen therewithin and a pencil pocket 25 provided with a pencil therewithin. A calendar pocket 26 is provided with a calendar to provide at-a-glance observation of the appropriate date to enable a shopper to be aware of dated specials and the like within a shopping trip, such as at a grocery store. A "V" shaped scissor pocket 27 provided with scissors therewithin has formed medially at an upper terminal edge of the pocket a snap fastener 28 for securement of the scissors within the pocket to provide selective release of the scissors for cutting coupons and the like at the store the apparatus is being utilized. A note pad 29 provided with a plurality of leafs of paper is further secured to the interior surface of the first plate 11.

The second plate 12 is provided with an accordion file 30 formed with an elongate hinge 31 formed between a rear face of the accordion file 30 and the second plate 12 to enable upward pivotment of the accordion file from a first horizontal position to a second vertical position, as illustrated in phantom in FIG. 1. A hook and loop flap secured to the second plate 12 is selectively fastenable to a hook and loop patch 32 formed in a forward face of the accordion file 30 to simultaneously secure the accordion file in a horizontal first position and to maintain coupons, notes, and the like stored within the accordion file within the file until retrieval of such items is desired. A polymeric plate 34 to provide a coupon presentation plate is formed with a non-porous smooth polymeric surface to receive a transparent flexible plastic sheet 35 thereover to secure coupons sandwiched between the polymeric plate 34 and the transparent plastic sheet 35 to provide visual presentation of the coupons and securement until their use is desired. Further, a calculator 36 is formed within a "U" shaped pocket 37 for enabling its use to solve various calculations, as desired.

It may be appreciated therefore that the synergistic inter-relationship of the various components and facilities provided by the instant invention enhances and facilitates the shopping of an individual.

As to the manner of usage and operation of the instant invention, the same should be apparent from the above description and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A shopping cart having front, back and sidewalls and being desk securable to a shopping cart of a predetermined width and length, said desk comprising,
   a first rigid plate formed with parallel exterior and interior surfaces, and
   a geometrically equal second rigid plate formed with exterior and interior surfaces pivotally mounted in edge to edge orientation relative to said first plate by an elongate hinge, and
   a first handle formed medially to an outer edge of said first plate spaced from said hinge and a second handle formed medially to an outer edge of said second plate spaced from said hinge wherein said first and second handle and said first and second plates are aligned with one another when said plates are pivoted from a first position horizontally aligned with one another and a second vertical position wherein said first and second plates are aligned in confronting interior face to interior face relationship relative to one another, said plates being dimensioned to extend substantially across said predetermined width overlapping said side walls and over a portion of said predetermined length of said shopping cart when said plates are in said first position, and
   a first securement flap formed on said outer edge of said first plate spaced from said first handle on one side of said first handle, and
   a first attachment patch aligned with said first securement flap when said first and second plates are in the second position and wherein said first attachment patch is formed on an outer edge of said second plate spaced from said second handle, and
   said first attachment patch and said first securement flap each include cooperative hook and loop fasteners, and
   latch means slidably mounted to the interior face of said first and second plate for securement of the first and second plate in said first position, and
   accessory means formed in said interior surfaces of said first& and second plate to assist an individual in shopping.

2. A shopping cart desk as set forth in claim 1 wherein said latch means include first and second rigid slide bolts spaced from one another wherein said first and second rigid slide bolts are slidably mounted within a respective first and second loop wherein said first and second loops are integrally secured to the interior surface of said first plate and aligned with respective first and second securement pockets to receive lowermost terminal edges of the first and second bolts overlying the hinge when the first and second bolts are received within the first and second securement pockets.

3. A shopping cart desk as set forth in claim 2 including an accordion file hingedly mounted to the interior surface of said second plate and pivotal from a first position horizontally aligned with said second plate to a second position vertically oriented relative to the interior surface of the second plate, and a further hook and loop patch secured to an outer face of the accordion file and engageable with a further flap secured at one end to the interior surface of the second face and formed with hook and loop fasteners securable to hook and loop fasteners of the further patch.

4. A shopping cart desk as set forth in claim 3 wherein said accessory means includes a smooth non-porous polymeric plate with a transparent flexible plastic sheet removably mounted overlying said plate to secure flexible planar items therebetween.

5. A shopping cart desk as set forth in claim 4 wherein said accessory means further includes a first and second pocket formed to the interior surface of the first plate and receiving therewithin a respective pen and pencil within said first and second pockets.

6. A shopping cart desk as set forth in claim 5 wherein said accessory means further includes a third pocket of generally "V" shaped configuration and including a pair of scissors removably mounted therewithin with a snap fastener formed medially of an upper terminal edge of said third pocket to secure the scissors therewithin.

7. A shopping cart desk as set forth in claim 6 further including a note pad including a plurality of sheets of note paper wherein said note pad is fixedly secured to the interior surface of the first plate.

8. A shopping cart desk as set forth in claim 7 wherein said accessory means further includes a fourth pocket with a calendar removably mounted therewithin wherein the fourth pocket enables visual observation of a calendar secured therewithin.

9. A shopping cart desk as set forth in claim 8 wherein said accessory means further includes a "U" shaped calculator pocket secured to the interior surface of the second plate with a calculator removably mounted therewithin.

10. A shopping cart desk as set forth in claim 9 wherein the first and second plates in the first position are of a length equal to the predetermined width of said shopping cart.

11. A shopping cart desk as set forth in claim 10 wherein a second securement flap is formed in alignment with said second handle on said outer edge of said second plate on one side of the second handle, and a second attachment patch aligned with said second securement flap when said first and second plates are in the second position.

* * * * *